Aug. 6, 1929. J. W. D. CHESNEY 1,723,603
PROCESS OF STERILIZATION AND FOOD ACTIVATION
Filed Feb. 17, 1928 2 Sheets-Sheet 1
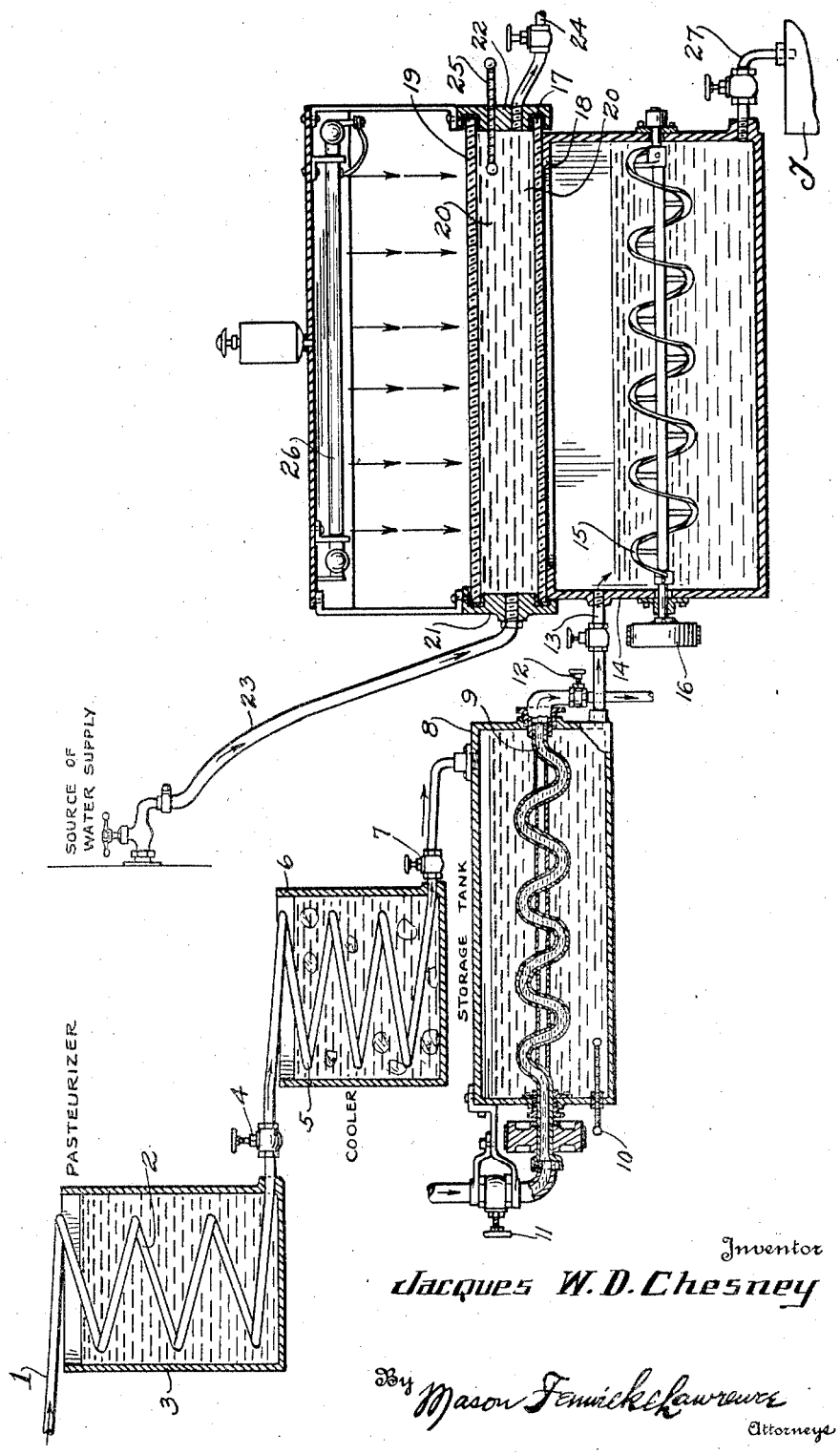

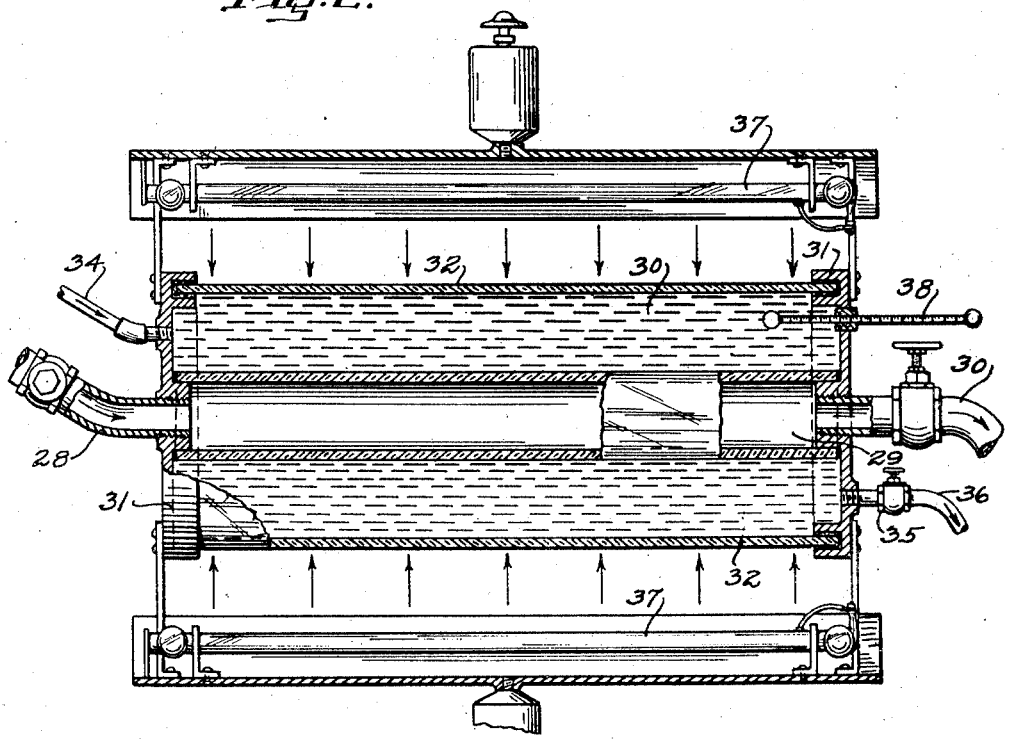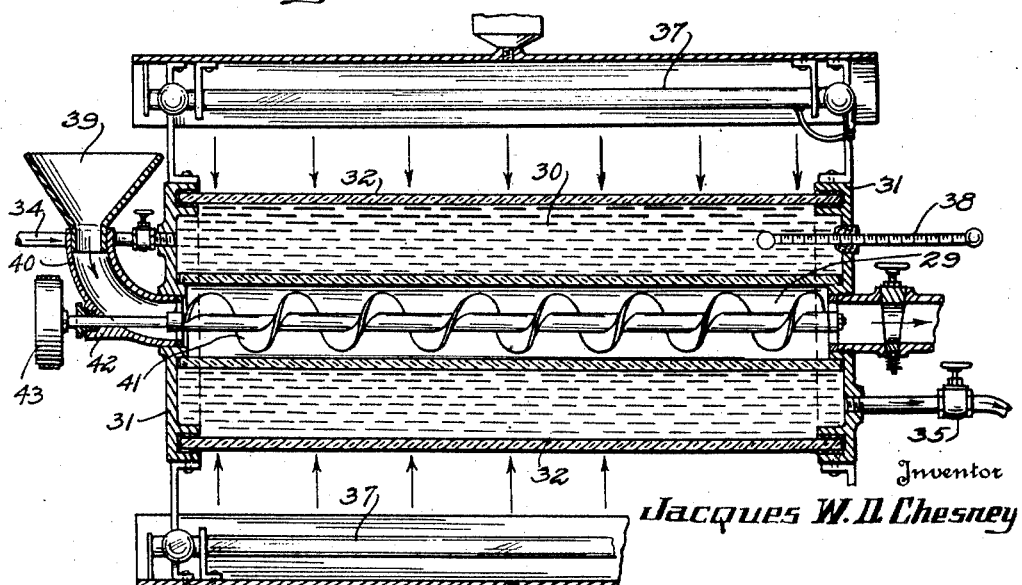

Patented Aug. 6, 1929.

1,723,603

UNITED STATES PATENT OFFICE.

JACQUES W. D. CHESNEY, OF CHICAGO, ILLINOIS, ASSIGNOR TO THE CHESNEY PROCESS, INC., OF CHICAGO, ILLINOIS.

PROCESS OF STERILIZATION AND FOOD ACTIVATION.

Application filed February 17, 1928. Serial No. 255,037.

This application is a continuance in part of my copending application, Serial No. 200,598, filed June 22nd, 1927.

This invention relates to a process and apparatus of sterilization and food activation.

It is a generally accepted fact that ultra violet rays are highly bactericidal. But of recent years it has been found by myself and many other research workers that ultra violet rays of certain wave length have the property of activating natural food products containing natural oils or fats. These fats contain substances called ergosterols (if from animals) and phytosterols (if from plants). These activated fats seem to act in the manner as vitamins and some authorities are of the belief that certain vitamins and these activated fats are one and the same thing.

It is well known that certain mineral elements will not become fixed in the body tissues without certain vitamins or ultra violet radiations or the activated fats. Hence, these activated fats are an active yet absolutely harmless medicinal food that have the property of preventing or even curing rickets, tuberculosis, etc.

Many scientists have irradiated milk, etc., to gain this effect, with more or less success, but the principal draw back is that they ray the food direct or else through quartz plates which permit the shorter ultra violet wave lengths to impinge the food substance, with free access to an excess of air, and this imparts a disagreeable taste and smell to said food. I have also discovered that this direct radiation of milk, eggs, etc., and especially with the ultra violet short wave lengths, destroys the vitamin C (also called the antiscorbutic) such as is normally found in tomatoes, cabbage, milk, etc.

On working with substances containing vitamin C, I have found that if the substance contains a small amount of acidity it is more able to withstand destructive agents such as extreme heat, ultra violet radiations, etc. Hence, in my work I have found valuable ways to activate food stuffs without impairing the taste or destroying vitamins.

In accordance with the present invention as will be described in the following description in connection with the accompanying drawings, the objects, advantages and particular steps of the process and construction of the apparatus will be more clearly pointed out.

In the accompanying drawings:

Figure 1 is a diagrammatic sectional view showing an apparatus for sterilization and food activation in accordance with my process particularly adapted for treating ice cream mix or milk products or the like.

Figure 2 is a similar view of an apparatus embodying another method of sterilization and activation permitting two sources of ultra violet rays to be used; and Figure 3 is a similar diagrammatic view of an apparatus for dry material activation.

Referring to the drawings in detail, and more particularly to Figure 1, in the activation of ice cream mix or milk products in general, I proceed as follows:

I first pasteurize the milk or ice cream mix in order to destroy pathological bacteria. Next, I cool the pasteurized product and render it slightly acid by the addition of some mild organic acid such as lactic, tartaric, or acetic or the like. Any percentage of acidity less than one percent gives satisfactory results. In the case of ice cream, I make the mix composed of milk, gelatin, eggs, sugar, and flavoring material and homogenize the mix. I then place the milk or mix in an air tight cask or tank to exclude air during the activation. This cask may be made of enameled metal, or porcelain or other material that is not soluble in the food to be activated and which is placed therein. I then place over a large opening in the top of the cask or tank a cell, composed of two layers of special glass, disposed with a space between them to permit a liquid or fluid cooling agent, such as water or air, or an absorber of infrared radiation, to circulate therethrough.

The special glass employed in this process is opaque to a large percentage of the infrared rays and transmits the ultra-violet rays down to approximately not lower than 2000 A. U. In the glass making art it is well known that glass containing small amounts of nickel transmit extreme red and infra-red, as well as ultra-violet; but glass high in nickel transmits only ultra-violet. The amount of infra-red transmitted varies, therefore, with the amount of nickel and the thickness of the glass. Glass suitable for applicant's purpose is disclosed fully in U. S. Patents #1305793 and #1305794, June 3rd, 1919. It will be obvious to persons skilled in the art that by varying suitably the relative percentages of the ingredients of the glass disclosed in said patents, that glass of practically any desired range of ray transmissibility may be made.

The special glass just described is capable alone of eliminating to some extent the infra-red rays and transmitting ultra-violet rays down to rays not shorter than 2000 A. U. This invention, however, is not limited to the use of this particular glass. A glass known to the trade generally as "Vita-Glass", invented by Professor Lamplough of Cambridge, England, is suitable in conjunction with an infra-red absorber, for practicing the process disclosed herein. This glass transmits the rays of the spectrum down to approximately 2640 A. U. and excludes all the shorter ultra-violet rays. It is therefore necessary to use an infra-red absorbent cell or medium with this vita glass, unless the product being activated is so cold that the infra-red rays, during the time limit of exposure of the product to the rays, would not heat the product sufficiently to produce any harmful effect.

Another glass suitable for use with an infra-red absorber is disclosed in the British Patent No. 263,410, December 30th, 1926. This is a calcium phosphate glass, described in said British patent, as having an ultra-violet transmission limit of approximately 2650 A. U. This glass will cut off the objectionable shorter ultra-violet rays, but will have to be supplemented by some other means for absorbing the infra-red rays.

The times of exposure of the product to the rays will, of course, depend upon the nature of the product, and the intensity of the rays. These times can be determined only by comparison of the results produced by the activated product, which, naturally, can be determined only by experiment, since the results are mainly physiological. However, in the case of milk, ice cream mix, and similar products, a safe period of exposure may be obtained by allowing about ten minutes exposure for each ten pounds of product.

In cases where an infra-red absorbent means is used in addition to the special glass, for transmitting ultra-violet rays only, this means is formed as a cell having panes of ultra-violet transmitting glass, separated by side and end walls, and provided with means for controlling the rate of flow therethrough of water or other suitable infra-red rays absorbent. The rate of flow is regulated to keep the temperature of the cell substantially constant, and at a desired temperature indicated by a thermometer fixed to the cell.

The apparatus for carrying out the foregoing process is indicated generally in Figure 1 of the drawing. Taking milk or ice cream mix as the product to be activated, the operation begins with the feeding of the product through a pipe 1, partly bent as a coil 2 arranged in a pasteurizing tank 3. The pipe emerges from the lower end of the pasteurizer tank 3, and continues through a control valve 4 to form a coil 5 immersed in a cooling vat 6.

From the cooling vat 6, the pasteurized and cooled product is conducted through a control valve 7 into a storage tank 8 having a cooling pipe worm 9 constantly rotating therein. This worm is fed from a suitable source with a cooling fluid, and serves not only to cool the pasteurized and cooled product, but also to mix the contents and maintain them at any desired constant temperature, which may be determined by a thermometer 10 fixed in tank 8 and by control of the rate flow of cooling fluid through the valves 11 and 12.

The desired amount of organic acid may be introduced into the product before admission to the pipe 1, or may be introduced and thoroughly mixed with the pasteurized and cooled product in the storage tank 8. It is immaterial where it is introduced so long as the product is slightly acidulated (not more than one percent) before it is passed on, through the valve controlled pipe, 13, from the storage tank 8 to the activating tank 14.

The activating tank 14 is provided with a worm 15 rotated by a pulley 16 connected to any suitable source of operation. The tank 14 and worm 15 are so relatively proportioned and arranged as to circulate all of the product in the tank, when full, against or close to the sheet 17 of ultra-violet transmitting glass suitably secured in water tight fit over an opening 18 in the top of tank 14.

A second sheet 19 of ultra-violet ray transmitting glass is spaced from and suitably secured above the sheet 17 to form a cell 20 having ends 21 and 22. Cooling fluid from any suitable source is introduced into the cell 20 through a valve controlled pipe 23, and a valve controlled pipe 24 at the other end of the cell controls the discharge of cooling fluid from the cell.

A thermometer 25 fixed in the end wall 22 indicates the temperature of the cooling fluid in the cell 20. The cooling fluid, preferably water, absorbs the infra-red heating rays, and it is essential that the temperature of the fluid be held below pasteurizing temperature at least. I prefer to maintain this temperature constant at about 70 degrees F. This can be readily obtained by controlling the rate of flow of the cooling fluid through the cell 20 by the valves in the intake and discharge pipes.

A source of ultra-violet rays 26 is supported at a suitable distance about the cell 20 to direct its rays upon and through the cell 20 on to the product in the activating tank 14. In the drawing this source is shown as a mercury vapor arc lamp, but it must be understood that any other source whatever of such rays may be substituted therefor.

As previously stated, the cell 20 is designed to absorb substantially all infra-red rays and to transmit ultra-violet rays down to approximately 2650 A. U. Where the product is cooled before admission to the tank 14, a single sheet of the Vita or glass having similar properties may be used, especially, where the cooled product travels so quickly past the activating glass that the infra-red heating rays have very little heating effect on the product. However, it is preferable in all cases, to absorb all the infra-red rays; and, accordingly, I prefer to use the infra-red absorbent cell with ultra-violet transmitting glass which does not cut off the infra-red rays. Where, however, the glass has also the property of cutting off the infra-red rays, it is intended that such glass will be used alone.

It is preferable that the tank 14, and the mixing and raying elements connected thereto, should be so constructed and relatively arranged that a batch of product filling the tank 14 will be fully activated in about thirty minutes; at the end of which period, the activated product may be discharged through a valve controlled discharge pipe 27 to any desired location for freezing or other further processing. Anyway, the activation process ends with the discharge of the product from tank 14.

It will be understood that the tank 14 is practically air tight, and that the activation raying is carried out with air substantially excluded from the tank during the raying process.

While I have shown only one raying device applied to the tank 14, it must be understood that any desired number may be used, and on different sides of the tank 14. Multiplying the number of raying devices naturally will decrease the times necessary for exposing the product to the rays and this may be found desirable in many cases.

In Figure 2, I have disclosed a form of the invention in which a fluid product designed for activation is passed through a valve controlled intake pipe 28 into a container 29 from which it may be discharged through a discharge pipe 30. The container 29 is cylindrical, and is formed of one of the special glasses above referred to. Where the glass cuts off the infra-red rays it will not be necessary to use the infra-red absorbent cells. Where it is found necessary or desirable to use such cells, a second cylinder 31 of longer diameter and of the same glass may be mounted concentrically with cylinder 29 on end supports 32 and 33. Cooling fluid may be introduced into the space formed between cylinders 29 and 30 through an intake pipe 34, and its rate of flow may be controlled by a valve 35 located in a discharge pipe 36.

Suitable sources 37 of ultra-violet rays may be arranged in any desired number around the cylindrical sheet 30; and the rate of flow of the liquid being activated will naturally depend upon the number of lamps used, and will be controlled by the valve in the discharge pipe 29. A thermometer 38 is inserted in one end of the raying cell to indicate the temperature of the cooling fluid which, as before, will be held substantially constant at any desired temperature under pasteurizing temperature, preferably around 70 degrees F.

A third form of the apparatus employed in practicing other process, is shown in Figure 3. This is substantially the same as that shown in Figure 2; but is designed for the activation of solids, such as solid fats, flour, whole ground grain, etc. In this form, the material to be activated is fed from a hopper 39 through a pipe 40 into the container 29 and is rotated and moved along this container at any suitable speed by a worm 41 secured to the shaft 41 rotatable in suitable bearings in opposite ends of container 29 and operable by a pulley 43 driven by any suitable source of energy.

The end of container 29 opposite hopper 39 is provided with a discharge pipe 44 controlled by a valve 45 to regulate the discharge of activated material from the container 29. Of course the rate of feed of material will depend upon the rate of rotation of the worm and the area of the discharge opening; but these are factors easily determined and readily controlled by anyone skilled in the art.

In order to protect vitamin C, I may use any of the acids previously mentioned— lactic, tartaric, acetic, etc., in any desirable form; or, in the case of ground grains, I may use a small amount of superphosphate of lime for accomplishing the object specified. Any desired quantity less than one percent of acid will be found satisfactory. I have found that with substances containing vitamin C, a slight acidulation enables the substance to withstand destructive agents such as extreme heat, ultra-violet radiation, etc., without impairing the taste or destroying the vitamins.

Heretofore, physicians have gained some of the same purposes of the ultra violet activated foods with cod liver oil. This is a nauseating product and recent researches have proved that in many cases it has other deleterious effects such as unfavorable heart symptoms. However, food such as described treated in accordance with the above process and with the apparatus shown or similarly related, will result in an activated food properly sterilized and without such deleterious effect or unfavorable symptoms and without the unpleasant taste referred to.

Air is composed of oxygen, nitrogen and other gases. When these gases are exposed to the ultra violet radiation, part of the oxygen is converted into ozone, which although a deorodant and germicide, gives a slight odor and taste to the product which is obnoxious or objectionable, especially to some people, and will destroy vitamin C even in the dark. Certain portions of the oxygen and nitrogen are also converted into oxides of nitrogen and other chemical combinations which are absorbed by the fluid or food and imparts a disagreeable taste and odor to the fluid or food. This is obviated by confining the product in substantially air tight containers, such as the tank 14 or containers 29 or 29'.

The process of sterilization of the product is also carried out to a highly effective degree by the activation process described. It has been repeatedly found that the bacterial content of products subjected to the pasteurization and raying treatment herein described have been reduced from very high counts—varying anywhere from 100,000 to 500,000—down to between 10,000 or 15,000 per c. c. which is practically constant and negligible.

It will thus be seen that I have provided a very efficient process and apparatus for sterilization and food activation which will obviate all the previous objections referred to herein and which will result in a scientifically prepared food product in fluid or dry form which shall be extremely valuable for the purposes stated. Also, while I have shown three different forms of the invention, it is to be understood that the apparatus as well as the process may be modified and that various changes may be made in the steps, sequence and in the construction of the apparatus according to the principles stated without departing from the spirit and scope of the invention as defined by the claims.

Having thus described my invention what I claim is:—

1. The process of sterilizing and activating a liquid, which consists in pasteurizing the liquid, mixing the pasteurized liquid with an organic acid to ensure an acidulation of not over one percent of the pasteurized product; then exposing the acidulated product to ultra-violet rays of not less than 2000 A. U. while excluding air from the product during the raying thereof.

2. The process of sterilizing and activating milk and products containing milk, which consists in pasteurizing the milk, ensuring an organic acidulation of not over one percent of the pasteurized product, exposing the acidulated pasteurized product to ultra-violet rays of not less than 2000 A. U. when air is excluded from the product during the raying thereof.

3. The process of activating fluent organic substances of dietary value (for example, milk, milk products, solid fats, flour, whole ground grain) which consists in mixing the same with an organic acid to ensure an acidulation of not over one per cent, and subjecting the acidulated mixture to the action of ultra-violet rays of not less than 2000 A. U.

4. The process of activating fluent organic substances of dietary value (for example, milk, milk products, solid fats, flour, whole ground grain) which consists in mixing the same with an organic acid to ensure an acidulation of not over one per cent and subjecting the acidulated mixture to the action of spectral rays from which substantially all of the infra-red rays and all ultra-violet rays shorter than 2000 A. U. have been filtered.

In testimony whereof I affix my signature.

JACQUES W. D. CHESNEY.